(12) United States Patent
Corrion et al.

(10) Patent No.: US 9,817,964 B2
(45) Date of Patent: Nov. 14, 2017

(54) METHODS AND APPARATUS TO FACILITATE SECURE SCREEN INPUT

(71) Applicant: Intel Corporation, Santa Clara, CA (US)

(72) Inventors: Bradley W. Corrion, Hillsboro, OR (US); Micah J. Sheller, Hillsboro, OR (US); Jeffrey M. Tripp, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/370,637

(22) Filed: Dec. 6, 2016

(65) Prior Publication Data

US 2017/0154179 A1    Jun. 1, 2017

Related U.S. Application Data

(63) Continuation of application No. 14/362,399, filed as application No. PCT/US2013/077402 on Dec. 23, 2013, now Pat. No. 9,514,304.

(51) Int. Cl.
*G06F 7/04* (2006.01)
*G06F 21/36* (2013.01)
(Continued)

(52) U.S. Cl.
CPC .......... *G06F 21/36* (2013.01); *G06F 3/04845* (2013.01); *G06F 3/04886* (2013.01);
(Continued)

(58) Field of Classification Search
CPC .......... G06F 21/31; G06F 21/36; G06F 21/56; G06F 2221/034; H04L 63/04886
(Continued)

(56) References Cited

U.S. PATENT DOCUMENTS 4,444,029 A * 4/1984 Remington ........... E05B 37/025
70/25
6,434,702 B1    8/2002 Maddalozzo, Jr. et al.
(Continued)

FOREIGN PATENT DOCUMENTS

KR    100623684    9/2006
KR    100828558    5/2008
WO    2013185020   12/2013

OTHER PUBLICATIONS

International Searching Authority, "International Search Report and Written Opinion," issued in connection with corresponding International Patent Application No. PCT/US2013/077402, dated Sep. 25, 2014 (12 pages).

(Continued)

*Primary Examiner* — Samson Lemma
(74) *Attorney, Agent, or Firm* — Hanley, Flight & Zimmerman, LLC

(57) ABSTRACT

Methods, apparatus, systems and articles of manufacture are disclosed to facilitate secure screen input. An example disclosed system includes a user interface (UI) manager to generate a UI comprising a quantity of ordinal entry points, each one of the quantity of ordinal entry points comprising a repeating selectable pattern, an ordinal sequence generator to generate an initial randomized combination of the quantity of ordinal entry points, the randomized combination stored in a trusted execution environment, and an offset calculator to calculate a password entry value by comparing an offset value and direction value retrieved from the UI with the initial randomized combination of the quantity of ordinal entry points.

20 Claims, 11 Drawing Sheets

(51) Int. Cl.

| | |
|---|---|
| *G06F 3/0488* | (2013.01) |
| *G06F 21/31* | (2013.01) |
| *G06F 21/56* | (2013.01) |
| *H04L 29/06* | (2006.01) |
| *G06F 3/0484* | (2013.01) |
| *G06F 21/55* | (2013.01) |

(52) U.S. Cl.
CPC .............. *G06F 21/31* (2013.01); *G06F 21/56* (2013.01); *H04L 63/083* (2013.01); *G06F 21/552* (2013.01); *G06F 2221/034* (2013.01)

(58) Field of Classification Search
USPC .......................................................... 726/17
See application file for complete search history.

(56) References Cited

U.S. PATENT DOCUMENTS

| | | | | |
|---|---|---|---|---|
| 8,087,275 | B2* | 1/2012 | Poppe ................... | E05B 19/205 70/284 |
| 9,514,304 | B2 | 12/2016 | Corrion et al. | |
| 2008/0172725 | A1* | 7/2008 | Fujii ................... | G07C 9/00158 726/5 |
| 2008/0172735 | A1 | 7/2008 | Gao et al. | |
| 2012/0110663 | A1* | 5/2012 | Kim ....................... | G06F 21/36 726/19 |
| 2012/0268393 | A1 | 10/2012 | Lee | |
| 2012/0299831 | A1 | 11/2012 | Lioy | |
| 2013/0047237 | A1* | 2/2013 | Ahn ..................... | H04L 9/3226 726/7 |
| 2015/0235024 | A1 | 8/2015 | Corrion et al. | |

OTHER PUBLICATIONS

Globalplatform, "GlobalPlatform Made Simple Guide: Trusted Execution Environment (TEE) Guide," retrieved from <http://www.globalplatform.org/mediaguidetee.asp>, retrieved on Sep. 24, 2013 (4 pages).

Trusted Computing Group, "TPM Main Specification," retrieved from <http://www.trustedcomputinggroup.org/tpm_main_specification>, retrieved on Sep. 25, 2013 (2 pages).

Trusted Computing Group, "TPM Main, Part 1 Design Principles," Specification Version 1.2, Revision 116, Mar. 1, 2011 (184 pages).

Trusted Computing Group, "TPM Main, Part 2 TPM Structures," Specification Version 1.2, Level 2, Revision 116, Mar. 1, 2011 (202 pages).

Trusted Computing Group, "TPM Main, Part 3 Commands," Specification Version 1.2, Level 2, Revision 116, Mar. 1, 2011 (339 pages).

International Bureau, "International Preliminary Report on Patentability," issued in connection with corresponding International Patent Application No. PCT/US2013/077402, dated Jul. 7, 2016 (8 pages).

United States Patent and Trademark Office, "Final Office Action," issued in connection with U.S. Appl. No. 14/362,399, dated May 5, 2016 (18 pages).

United States Patent and Trademark Office, "Non-Final Office Action," issued in connection with U.S. Appl. No. 14/362,399, dated Oct. 23, 2015 (15 pages).

United States Patent and Trademark Office, "Notice of Allowance," issued in connection with U.S. Appl. No. 14/362,399, dated Aug. 16, 2016 (12 pages).

European Patent Office, "Extended European Search Report," issued in connection with European Patent Application No. 13900018.6, dated Jul. 12, 2017, 7 pages.

* cited by examiner

| | ORDINAL POSITION | ORIGINAL VALUE | OFFSET | +/- | RESULT |
|---|---|---|---|---|---|
| 362 → | 0 | 2 | 3 | - | 9 |
| 364 → | 1 | 3 | 3 | ... | ... |
| 366 → | 2 | 8 | 3 | ... | ... |
| 368 → | 3 | 5 | 1 | ... | ... |

| NORMAL POSITION | FIRST VALUE | SECOND VALUE | THIRD VALUE | ... |
|---|---|---|---|---|
| 0 | 1 | 6 | ... | |
| 1 | ② | 7 | ... | |
| 2 | 3 | ⑧ | ... | |
| 3 | 4 | 9 | ... | |
| 4 | 5 | 0 | ... | |
| 5 | 6 | 1 | ... | |
| 6 | 7 | 2 | ... | |
| 7 | 8 | 3 | ... | |
| 8 | 9 | 4 | ... | |
| 9 | 0 | 5 | ... | |

METHODS AND APPARATUS TO FACILITATE SECURE SCREEN INPUT

RELATED APPLICATIONS

This patent arises from a continuation of U.S. patent application Ser. No. 14/362,399, filed Jun. 2, 2014, entitled "Methods and Apparatus to Facilitate Secure Screen Input," which is a national stage entry of International Application Serial No. PCT/US2013/077402, filed Dec. 23, 2013, entitled "Methods and Apparatus to Facilitate Secure Screen Input." U.S. patent application Ser. No. 14/362,399 and International Application Serial No. PCT/US2013/077402 are hereby incorporated by reference in their entireties.

FIELD OF THE DISCLOSURE

This disclosure relates generally to device security, and, more particularly, to methods and apparatus to facilitate secure screen input.

BACKGROUND

In recent years, personally identifiable information (PII) has been under attack by attackers. PII participates in many aspects of computing device usage and allows associated users of the computing devices to access one or more services (e.g., e-mail services, banking services, etc.). To obtain and/or otherwise steal the PII, attackers employ malicious software resident on the computing device to monitor one or more input devices, such as keyboards and/or keyboard touch-screen interfaces.

DETAILED DESCRIPTION

Malicious software may have one or more opportunities to become resident on a computing device, such as a household personal computer (PC), a tablet, a smartphone and/or any other type of computing device. Once such malicious software is resident on the computing device, it may listen and/or otherwise monitor input devices of the computing device (e.g., keyboard strokes, mouse movement, touchscreen position and timing information, etc.). Personally identifiable information (PII) can be discovered and/or otherwise stolen by the malicious software based on, for example, keystrokes entered by a user of the computing device, which may reveal password information, password hint information, social security numbers and/or personal identification numbers (PINs).

Figure 1A:
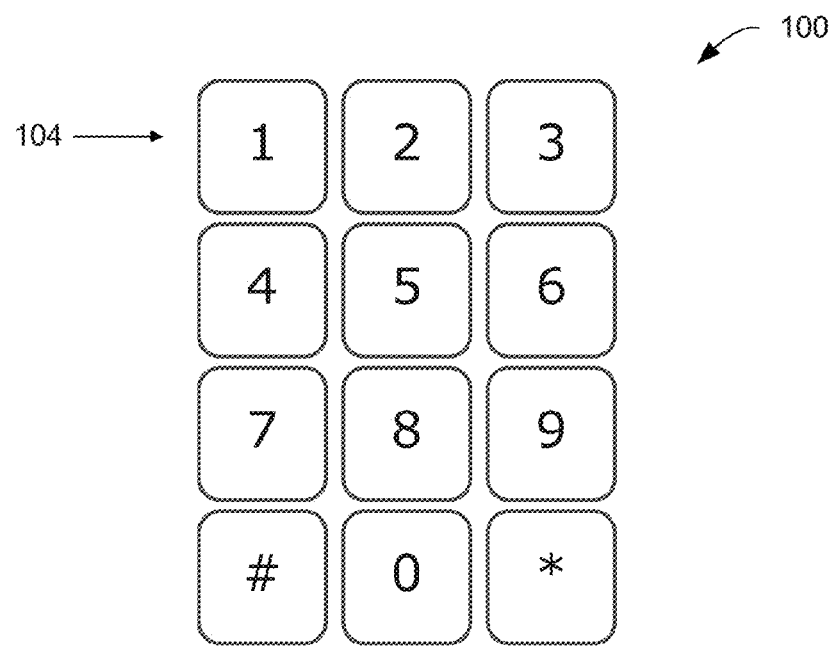
FIG. 1A is an illustration of a known unmodified keypad interface.

To defend against monitoring of keystrokes and/or button presses by the malicious software, protected video frame buffers may be used, which prevents such malicious software from gaining useful knowledge from the location(s) of entry controls on a display. In some examples, isolated execution environments create content for a private frame buffer and correlate user input (e.g., button presses, finger presses, finger gestures, etc.) to meaningful and private actions. For example, the isolated execution environment may generate a button pad having randomized values. In the illustrated example of FIG. 1A, an unmodified keypad 100 includes numeric coordinates in a sequential order, which reflects an order consistent with numeric keypads typically found on keyboards, telephone dial pads and/or touchscreen user interfaces (UIs). On the other hand, FIG. 1B includes an example modified keypad 102 having numeric coordinates in a randomized order. For instance, while an example typical unmodified keypad 100 of FIG. 1A includes a first row 104 of three sequential numeric coordinates labeled "1," "2," and "3," the example modified keypad 102 of FIG. 1B includes a first row 106 having random coordinates labeled "9," "3," and "5."

Figure 1B:
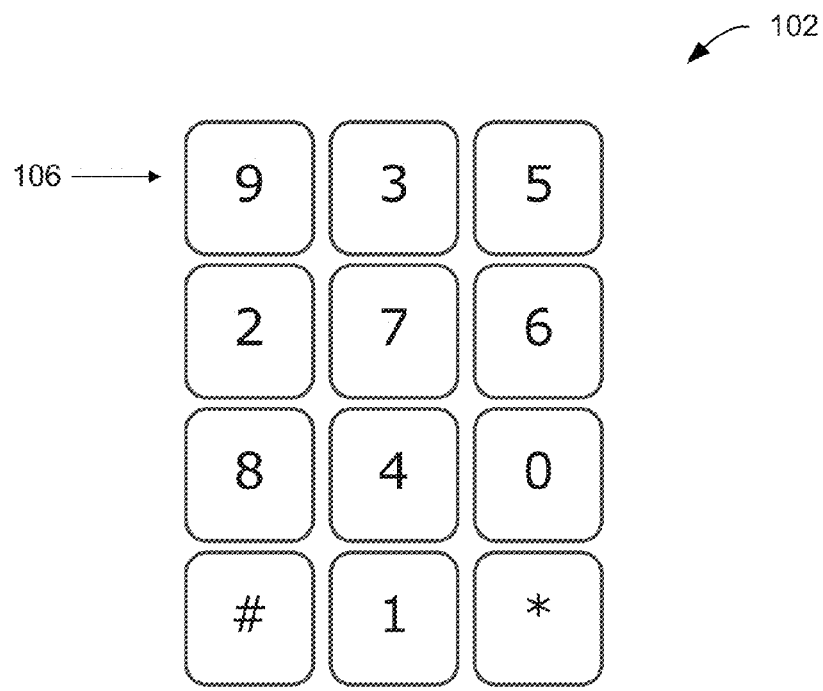
FIG. 1B is an illustration of a modified keypad interface.

When a user of the computing device presses one or more coordinates of the modified keypad 102 of FIG. 1B, such inputs are correlated back to a secret value (e.g., a PIN) via a mapping table stored in a trusted environment. As such, even if the malicious software had infected the example platform 400 and the malware were able to determine a keypress of the coordinate associated with "9" on the top row 106 (which is a coordinate location traditionally associated with numeric value "1"), the malicious software would be unable to correlate the associated numeric value because the lookup table is stored within the trusted environment. Although the example modified keypad 102 of FIG. 1B randomizes the coordinate layout and stores a corresponding lookup table in the trusted environment, the randomized keypad is non-optimal for users because, in part, the randomization removes muscle memory advantages and preferences that users expect from user interfaces. Additionally, original equipment manufacturers (OEMs) frequently refuse to incorporate randomized keyboards on unattended devices (e.g., automated teller machines (ATMs)) based on negative user experiences and feedback.

Example methods, systems, apparatus and/or articles of manufacture disclosed herein facilitate a relatively quick and intuitive user interface that preserves user muscle memory preferences, as compared to randomized keyboards. Examples disclosed herein incorporate randomization in a manner that allows user button presses, clicks and/or gestures to occur faster than would otherwise be possible with randomized keyboards. In particular, examples disclosed herein generate rotating drum user interfaces and/or rotating dial user interfaces.

Figure 2A:
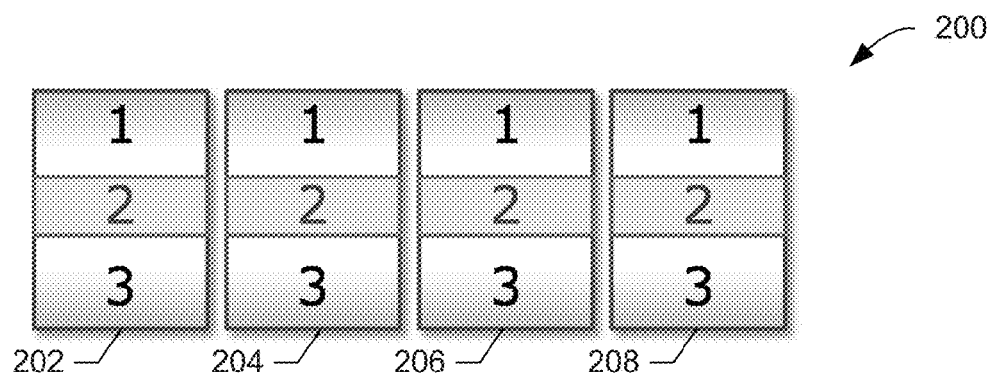
FIGS. 2A, 2B and 3A are examples of rotating drum displays constructed in accordance with the teachings of this disclosure.

In the illustrated example of FIG. 2A, a first rotating drum display 200 includes a first ordinal drum 202, a second ordinal drum 204, a third ordinal drum 206 and a fourth ordinal drum 208 (collectively referred to herein as "entry points," or "ordinal entry points"). Each ordinal drum of the example rotating drum display 200 may be adjacent to another ordinal drum to create a series of rotating drums. Each ordinal drum may represent one digit of a password, and may rotate up or down in response to a user input. The first rotating drum display 200 appears and operates in a manner similar to a luggage combination lock or a slot machine. For example, if a user of a touchscreen on which the first rotating drum is displayed touches the first ordinal drum 202 in an upward direction, a corresponding increase of the ordinal value will result (e.g., the value "2" will increase to the value "3"). On the other hand, if the user of the touchscreen on which the first rotating drum is displayed touches the first ordinal drum 202 in a downward direction, a corresponding decrease of the ordinal value will result (e.g., the value "2" will decrease to the value "1").

Figure 2B:
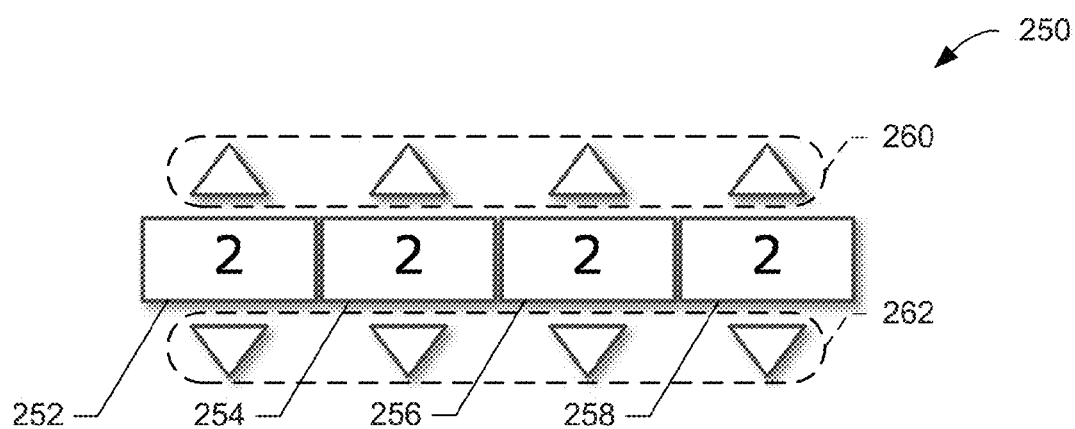

In the illustrated example of FIG. 2B, a second rotating drum display 250 includes a first ordinal drum 252, a second ordinal drum 254, a third ordinal drum 256 and a fourth ordinal drum 258. Each ordinal drum of the example second rotating drum display 250 may rotate up or down in response to selection of corresponding upward selectors 260 or corresponding downward selectors 262. For example, if the user of the touchscreen on which the second rotating drum is displayed touches an upward selector 260 corresponding to the first ordinal drum 252, a corresponding increase of the ordinal value will result (e.g., the value "2" will increase to the value "3"). On the other hand, if the user of the touchscreen on which the second rotating drum is displayed touches a downward selector 262 corresponding to the first ordinal drum 252, a corresponding decrease of the ordinal value will result (e.g., the value "2" will decrease to the value "1").

While the illustrated example first rotating drum display 200 of FIG. 2A illustrates numeric values in each of the first ordinal drum 202, the second ordinal drum 204, the third ordinal drum 206 and the fourth ordinal drum 208, any other alphanumeric character and/or symbol may be used. Similarly, while the illustrated example second rotating drum display 250 of FIG. 2B illustrates numeric values in each of the first ordinal drum 252, the second ordinal drum 254, the third ordinal drum 256 and the fourth ordinal drum 258, any other alphanumeric character and/or symbol may be used. As used herein, the term "ordinal drum(s)" generally refer to one or more of the four (4) ordinal drums from the example first rotating drum display 200 and/or the example second rotating drum display 250. Additionally, each drum includes a finite quantity of individual values that repeat as the drum rotates, whether such values are numbers, letters and/or symbols. When a user reaches the end of a rotating drum having a last one of the finite quantity of individual values, the sequence of such values repeats. In other words, an ordinal drum may rotate in a single direction (e.g., up) indefinitely to cycle through a display of all of the quantity of individual values.

Each of the ordinal drums (e.g., the first ordinal drum 202, the second ordinal drum 204, etc.) may have the same set of individual values. For example, the first ordinal drum 202 of the first rotating drum display 200 includes ten (10) individual values ranging from zero "0" to nine "9" (a numerically consecutive series). Similarly, the second ordinal drum 204 and all other drum(s) of the example first rotating drum display 200 include ten (10) individual values ranging from zero "0" to nine "9." However, in other examples each drum of the example first (and/or second) rotating drum display 200 include a different quantity, order and/or type of individual values. For example, the first ordinal drum 202 includes ten (10) individual values ranging from zero "0" to nine "9," and the second ordinal drum 204 includes twenty-six (26) individual values ranging from lower-case letter "a" to lower-case letter "z," and the third ordinal drum 206 includes thirty-six (36) individual values ranging from zero "0" to nine "9" and upper-case "A" to upper-case "Z," and the fourth ordinal drum 208 includes five symbols of a percent-sign "%," a dollar-sign "$," a hash "#," an ampersand "&," and an asterisk "*." Any other combinations of values and/or quantities of values may be realized by example methods, systems, apparatus and/or articles of manufacture disclosed herein.

While the illustrated examples disclosed above include a first rotating drum display 200 and a second rotating drum display 250, the following manner of operation will focus on the first rotating drum display 200 in the interest of brevity, and not limitation. To facilitate privacy improvements over traditional randomized keypads, while maintaining user efficiency benefits associated with muscle memory, example methods, apparatus, systems and/or articles of manufacture disclosed herein randomize the rotating dials of the example first rotating drum display 200 upon first use (an initial randomized combination), which is shown as the second rotating drum display 250 of FIG. 2B. As the drum ordinals rotate, a value of zero will be followed by a value of one "1," which will be followed by a value of two "2," and so on. In this manner, even if the ordinal values are initially displayed in a random order, a user will immediately become familiar with which direction to rotate the drum to obtain the desired value. As a contrast, the example modified keypad 102 of FIG. 1B also provides randomized keys to the user, but orientation is less intuitive because the example modified keypad 102 does not reflect any sequential pattern for rapid familiarity. After the positions of the dials are set in randomized positions, an index of each dial position is stored in a translation map of the trusted environment. After a user selects one of the dials to change a position, a delta value and corresponding direction indication is sent to the trusted environment so that the final positions of each drum can be calculated.

Figures 3A, 3B:
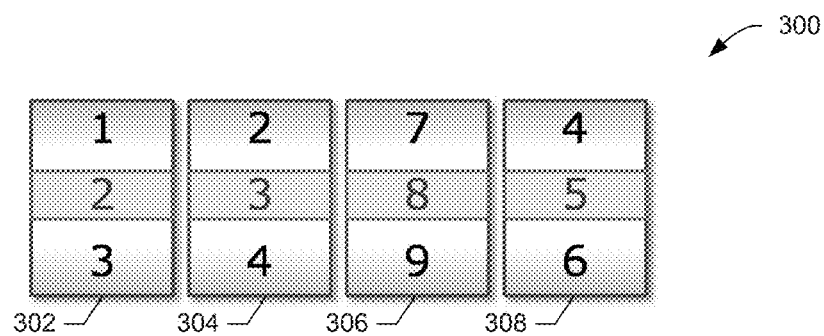
FIGS. 3B, 6C and 7B are illustrations of example translation maps constructed in accordance with the teachings of this disclosure.

In the illustrated example of FIG. 3A, a rotating drum display 300 includes a first ordinal drum 302, a second ordinal drum 304, a third ordinal drum 306 and a fourth ordinal drum 308. Unlike the illustrated example of FIG. 2A, in which each ordinal position has a value set to "2," the example rotating drum display 300 includes a random set of values for each ordinal position. In particular, the example rotating drum display 300 has an initial random value of "2385." In the event a user of a computing device alters the example first ordinal drum 302 (e.g., by swiping a finger in an upward direction, by clicking a mouse indicator in a region above the drum 302, by causing a mouse indicator to swipe in an upward direction over the drum 302, etc.), then an offset value and a direction is sent to and/or otherwise retrieved by the trusted environment to calculate the value for the first ordinal drum 302. For example, if the user swipes in an upward direction two times, then the trusted environment receives an offset value of two (2) and a direction indicator of "up." The trusted environment applies the received offset value and direction indicator to the initial random value for the first ordinal drum to calculate a result of four (4), which represents adding two to the initial random value of two (2). In another example, if the user swipes in a downward direction three times, then the trusted environment receives an offset value of three (3) and a direction indicator of "down." The trusted environment applies the received offset value of three (3) and subtracts it from the initial random value of two (2). As a result, the ending value of the example first ordinal drum 302 is nine (9) (e.g., the above example assumes a drum having sequential integers zero through nine, in which the integer nine wraps around to begin again at zero).

FIG. 3B illustrates an example translation map 350 that includes an ordinal position column 352 an original value column 354, an offset column 356, a direction column 358 and a result column 360. The example ordinal position column 352 includes a first row 362 associated with the example first ordinal drum 302, a second row 364 associated with the example second ordinal drum 304, a third row 366 associated with the example third ordinal drum 306, and a fourth row 368 associated with the example fourth ordinal drum 308. Continuing with the example above, the example rotating drum display 300 of FIG. 3A is invoked for user interaction having a randomized sequence of values on each rotating drum (i.e., 2385), which is shown in the example translation map 350 in the original value column 354. The example original value of "2385" in the illustrated example of FIGS. 3A and 3B may be generated by a random number generator within the trusted execution environment and/or any other original value may be selected and/or otherwise set by authorized personnel. For the sake of example, assume that a user interacts with the example first ordinal drum 302 by swiping in a downward direction three times. As a result, the example translation map 350 of FIG. 3B is populated with an offset value of three (3) in the example offset column 356, and an decrement indicator (e.g., a minus sign "−") in the example direction column 358. To reveal the result of the user action, the trusted execution environment subtracts three positions from the original value, and stores the result in the example result column 360. In other words, because the example first ordinal drum 302 has a sequence of integer values "0, 1, 2, 3, 4, 5, 6, 7, 8, 9," then three ordinal positions down from the starting position of two "2" results in nine "9" because each drum repeats in a cyclical and/or otherwise rotating manner.

Figure 4:
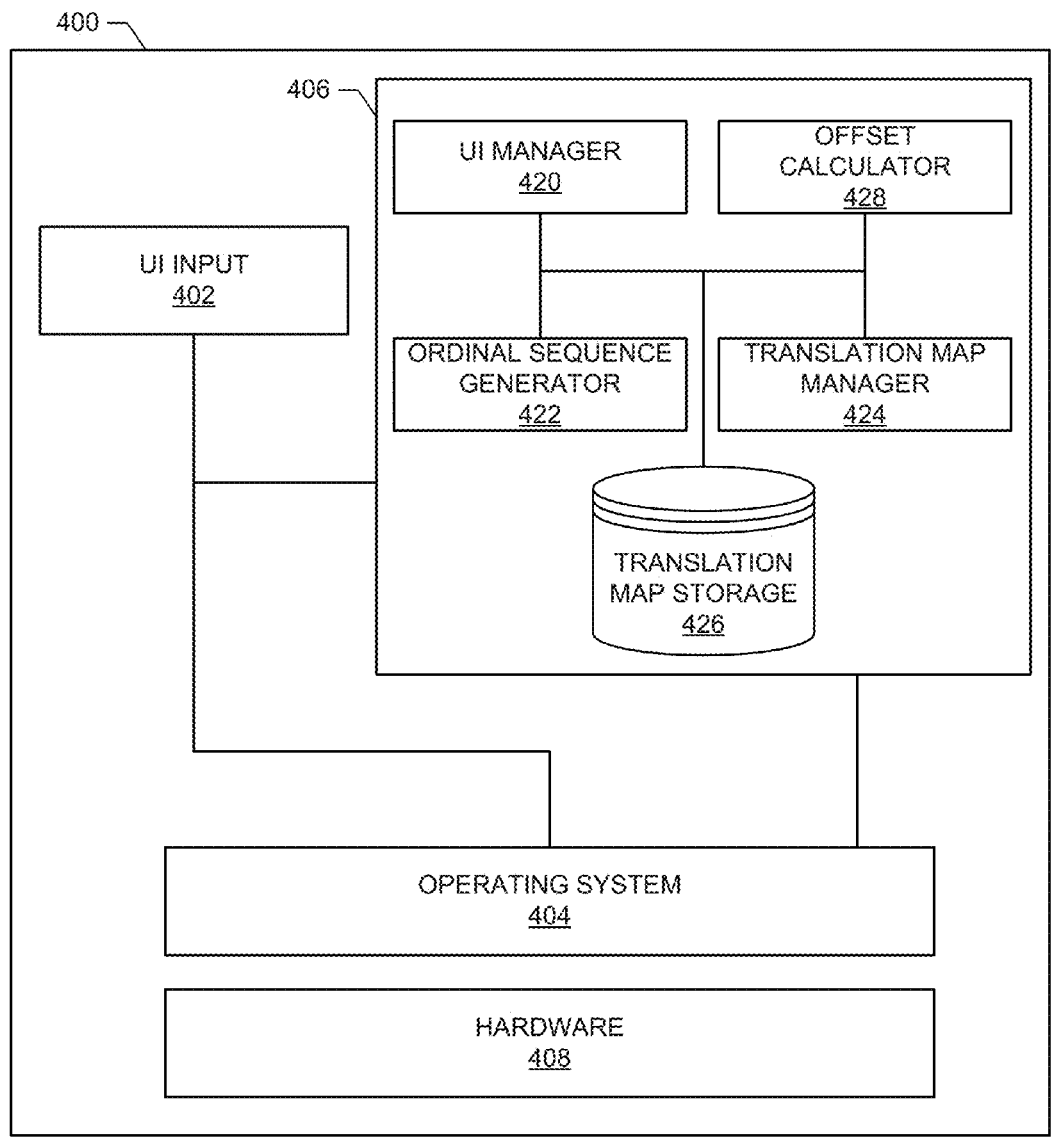
FIG. 4 is a schematic illustration of an example platform having a trusted execution environment constructed in accordance with the teachings of this disclosure.

FIG. 4 illustrates an example platform 400 to facilitate secure screen input. In the illustrated example of FIG. 4, the platform 400 includes a user interface 402 communicatively connected to an operating system (OS) 404 and a trusted execution environment (TEE) 406. The example TEE 406 is selectively isolated from the OS 404, but may operate in conjunction with the OS 404 to provide one or more services. For example, the OS 404 may provide services to render the user interface 402 and respond to input prompts, but the TEE 406 retrieves and/or otherwise receives such inputs for processing to derive and/or otherwise calculate password values. While the example platform includes its own hardware 408 on which the example OS 404 executes, the example TEE 406 is a separate hardware entity capable of process management and/or execution independent of the platform hardware 408. Additionally, trusted applications that execute within the example TEE 406 have full access to the platform hardware 408 and/or other resources of the platform 400, while the example TEE 406 maintains full control of cryptographic and/or other security operations associated with the trusted applications executing thereon. In some examples, the TEE 406 is implemented as a trusted platform module (TPM) in a manner consistent with TPM specification 1.2 (Revision 116) published by the Trusted Computing Group on Mar. 3, 2011, which is hereby incorporated by reference herein in its entirety.

In the illustrated example of FIG. 4, the TEE 406 includes a user interface manager 420, an ordinal sequence generator 422 (sometimes referred to herein as a sequence generator), a translation map manager 424 communicatively connected to a translation map storage 426, and an offset calculator 428. In a typical platform, the example OS 404 generates an interface to be displayed on the UI 402 to receive user input in the form of keyboard password information, touch screen password digit entry, or any other type of human-machine entry information. However, the example OS 404 and the example UI 402 are assumed to be insecure and subject to monitoring my malicious software (e.g., malware) that is capable of monitoring keystrokes and/or user presses on a touchscreen. In view of this assumed lack of security, in the event a user enters a password on a numeric keypad, the malware can identify the location of each touchscreen press to derive the password of the user. For example, if the user were to press each of the top three (3) buttons in the top row 104 of the example unmodified keypad 100 of FIG. 1A from left to right, then the malware can derive a password of "1," "2," "3" based on the spatial information associated with each button press.

To minimize and/or otherwise eliminate derivation of password information entered by a user via the example UI 402, the example user interface manager 420 responds to an indication of password entry and generates a rotating drum display to be presented to the user on the example UI 402. In some examples, the example user interface manager 420 overrides a default interface that may be generated by the example OS 404. In other examples, the example OS 404 generates the rotating drum display, but authentication functions are carried out within the example TEE 406, as described in further detail below. In the event the example user interface manager 420 overrides the default interface that is generated by the example OS 404, such as a default keypad similar to the unmodified keypad 100 of FIG. 1A, then the example ordinal sequence generator 422 identifies a number of digits required for the rotating drum display. Additionally, the example ordinal sequence generator 422 generates a random value sequence to be displayed on the rotating drum display and provides the random value sequence to the example user interface manager 420 for presentation to the user.

Continuing with the example described above in connection with FIG. 3A, if the ordinal sequence generator 422 identifies a need for a four-digit numeric password, and generates a random value sequence of "2385," then this value is passed to the example user interface manager 420 to be presented on the example UI 402. Additionally, the random value sequence of "2385" is provided to the example translation map manager 424 to build a translation map associated with the UI 402. Any number of translation maps may be generated and/or otherwise built by the translation map manager 424 and stored in the example translation map storage 426. When the user modifies the first ordinal drum 302 displayed within the example UI 402 by swiping in an upward direction four (4) times, the example user interface manager 420 receives and/or otherwise retrieves an offset value of four (4) and a direction indication of "up" (the direction indication may include any value or symbol indicative of a direction in which an ordinal drum is changed). In other examples, the user interface manager 420 receives and/or otherwise retrieves an offset value and a direction value in response to each interaction on the UI 402. As such, if a first user interaction is a downward swipe, the example user interface manager 420 retrieves and/or otherwise receives an offset value of one (1) and a corresponding downward indicator. In other words, by obtaining the offset value and direction in response to each user interaction with the example UI 402, the example user interface manager 420 can track a net result number of drum position movements and corresponding direction(s) regardless of the order in which the user moves one or more ordinal drums.

Assuming that the example rotating drum display 300 were always set at "0000," then any malware that infiltrated an insecure input mechanism (e.g., a touch-sensitive overlay of the UI 402) would be able to derive a password combination based on tracking a number of swiping events. On the other hand, while any malware operating on the example platform 400 may identify four (4) separate swiping actions at a particular coordinate location of the example UI 402, the malware does not have access to the initial random value sequence of "2385" that is stored within the TEE 406. Additionally, the TEE 406 and/or platform resources 408 may employ a protected video frame buffer to conceal the content displayed on the UI 402. As a result, the final password value cannot be determined by the malware because information of the initial starting point of the example rotating drum display 300 is unavailable to the malware.

After user input activity has been completed, the example offset calculator 428 calculates the entered password information by adding or subtracting retrieved offset values from the initial starting value. Continuing with the example above, if the user performed a swiping action in an upward direction one time on the example first ordinal drum 302, the example second ordinal drum 304, the example third ordinal drum 306, and the example fourth ordinal drum 308, then the example offset calculator 428 would add one (1) to the initial starting value "2385" to reveal a password "3496."

In some examples, after a user modifies an ordinal drum to enter one digit of a password, the example ordinal sequence generator 422 generates new random values for the remaining ordinals. At least one benefit of re-randomizing the remaining ordinals includes obfuscating the efforts of an onlooker when a user is interacting with the example UI 402. To illustrate, FIG. 5 reflects the example rotating drum display 300 of FIG. 3A, which includes the first ordinal drum 302, the second ordinal drum 304, the third ordinal drum 306 and the fourth ordinal drum 308. The four ordinal drums of the example rotating drum display 300 are shown in a column, and four separate user input instances occur in a sequence from the top to the bottom of FIG. 5. At a first instance (Instance 1), the example rotating drum display 300 has a randomized initial value of "2385," which is stored in the example translation map storage 426 as a translation map similar to that shown in FIG. 3B (e.g., translation map 350). Additionally, assume that the true password that will enable the user to gain access and/or services of the example platform 400 is "6447." The true password value may be stored in the TEE 406 for later comparison after user entry on the example UI 402 has occurred. In the event the entered password information is correct, the example TEE 406 may inform the OS 404 that authentication was successful, thereby allowing a user of the example platform 400 to access one or more services (e.g., a web page, an executable program of the platform 400, a file access in a storage location of the platform 400, access to one or more platform resources 408, etc.).

During Instance 1, the user swipes in an upward direction four (4) times, thereby advancing the first ordinal drum 302 from an initial value of "2" to an ending value of "6." As described above, the example user interface manager 420 retrieves and/or otherwise receives the offset value of four (4) associated with an upward indicator, and the example offset calculator 428 adds the offset value of four (4) to the initial randomized value of two (2) to yield a final password entry value of six (6). After a dwell time indicative of the user being deemed finished with modification of the example first ordinal drum 302, the example ordinal sequence generator 422 re-randomizes any remaining ordinal drums that have not yet been set by the user, as shown by Instance 2. In the illustrated example of FIG. 5. Instance 2 includes an "X" in the first ordinal drum 302 location to indicate that the first ordinal drum 302 has been modified by the user. Additionally, during Instance 2 the remaining ordinal drums (i.e., the example second ordinal drum 304, the example third ordinal drum 306 and the example fourth ordinal drum 308) have been re-randomized by the example ordinal sequence generator 422 with the value "629."

Figure 5:
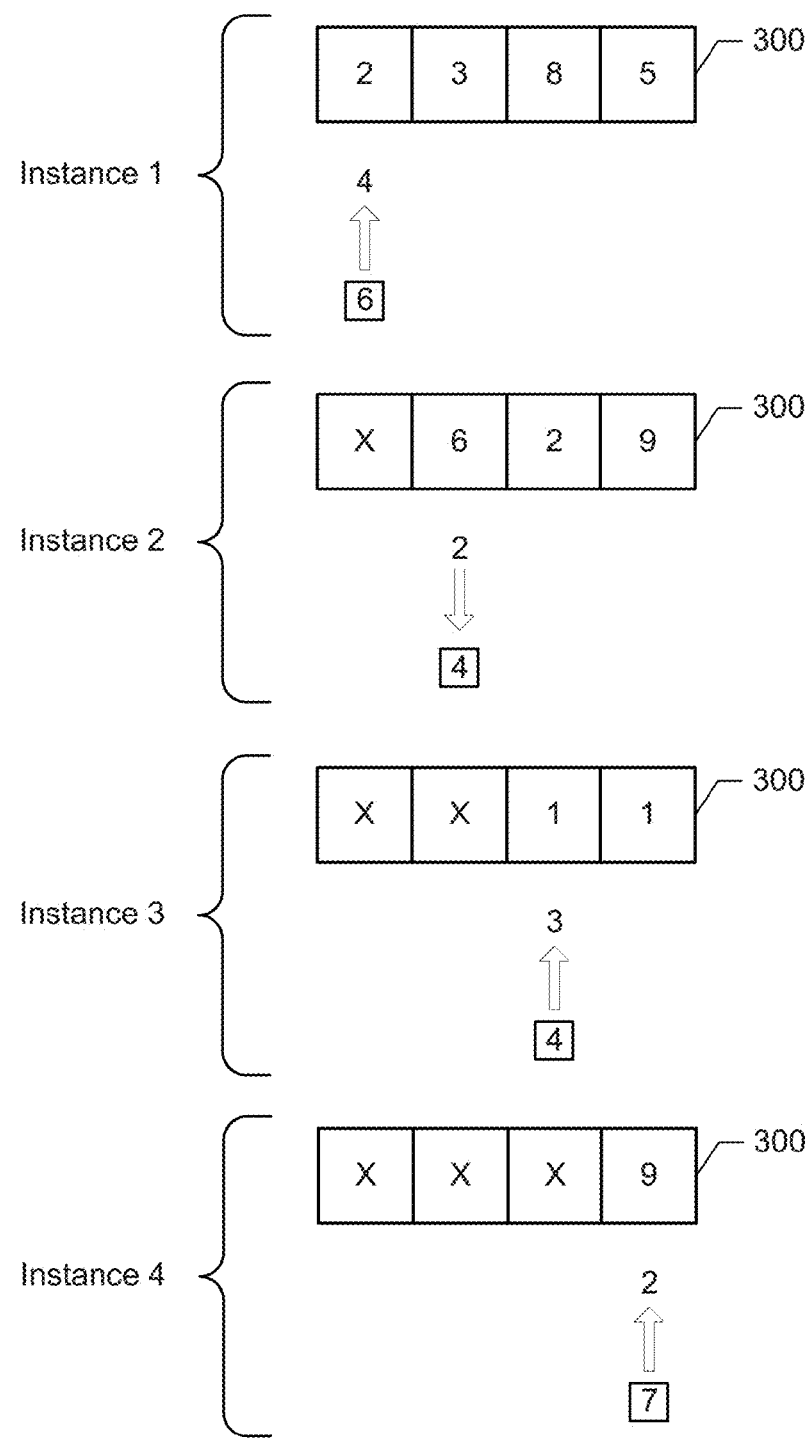
FIG. 5 is an example rotating drum display generated by the example trusted execution environment of FIG. 4 to facilitate secure screen input.

During Instance 2, the user swipes in a downward direction two (2) times, thereby modifying the example second ordinal drum 304 from an initial value of "6" to an ending value of "4." As described above, after the example user interface manager 420 retrieves and/or otherwise receives the offset value and direction indicator (i.e., in the illustrated example of FIG. 5 the offset value is two (2) and the direction indicator is indicative of a downward swipe), the resulting ordinal value is calculated by the example offset calculator 428, and the recently modified ordinal drum is identified with an "X." As a result of the modification, and after a dwell time, the example ordinal sequence generator 422 re-randomizes the remaining ordinals that have not yet been modified by the user (i.e., the example third ordinal drum 306 and the example fourth ordinal drum 308). In the illustrated example of FIG. 5, the re-randomized value is "11."

During Instance 3, the user swipes in an upward direction three (3) times, thereby modifying the example third ordinal drum 306 from an initial value of "1" to an ending value of "4." As described above, after the example user interface manager 420 retrieves and/or otherwise receives the offset value and direction indicator (i.e., in the illustrated example of FIG. 5 the offset value during Instance 3 is three (3) and the direction indicator is indicative of an upward swipe), the resulting ordinal value is calculated by the example offset calculator 428, and the recently modified ordinal drum is identified with an "X." As a result of the modification, and after a dwell time, the example ordinal sequence generator 422 re-randomizes the remaining ordinal(s) that have not yet been modified by the user (i.e., the example fourth ordinal drum 308). In the illustrated example of FIG. 5, the re-randomized value is "9."

During Instance 4, the user swipes in a downward direction two (2) times, thereby modifying the example fourth ordinal drum 308 from an initial value of "9" to an ending value of "7." As described above, after the example user interface manager 420 retrieves and/or otherwise receives the offset value and direction indicator (i.e., in the illustrated example of FIG. 5 the offset value during Instance 4 is two (2) and the direction indicator is indicative of a downward swipe), the resulting ordinal value is calculated by the example offset calculator, and the recently modified ordinal drum is identified with an "X." Because no additional ordinals associated with the password are needed, the aggregate password values may be tested and/or otherwise analyzed by the example user interface manager 420 to determine whether a correct password value has been entered. In other words, if the entered values equal "6447," then the password correctly matches password information that is stored in the TEE 406.

Figure 6A:
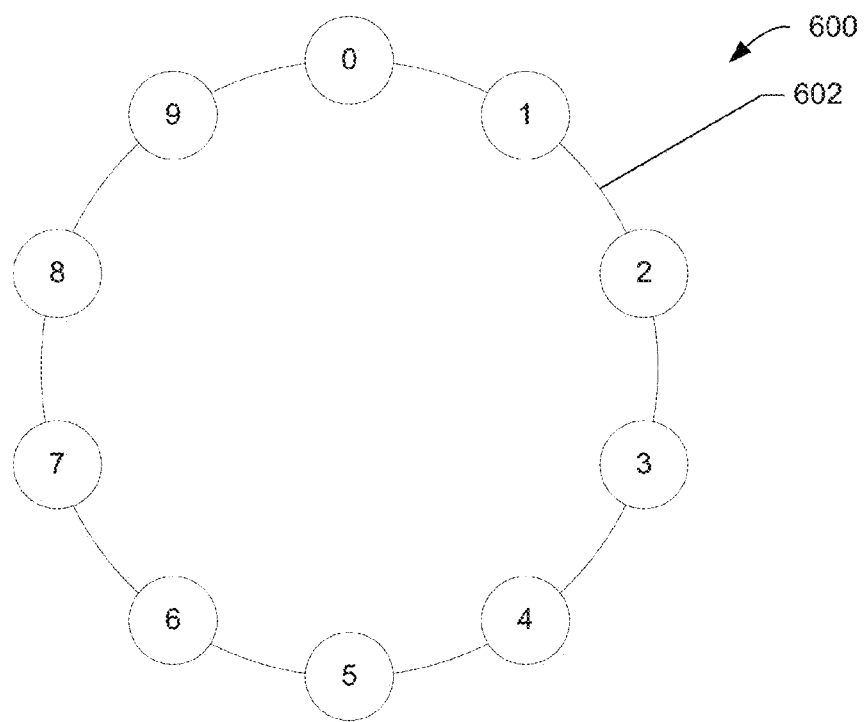
FIGS. 6A and 6B are examples of closed-loop circular shape user interfaces generated by the example trusted execution environment of FIG. 4 to facilitate secure screen input.

While the illustrated examples above include randomization of a drum-based user interface, example methods, apparatus, systems and/or articles of manufacture disclosed herein are not limited thereto. FIG. 6A includes an example radial UI 600 having ten (10) radially and sequentially arranged buttons (zero through nine) around a closed-loop circular shape 602. As described in further detail below, the example circular shape 602 is discussed herein for the purpose of example and not limitation. In the illustrated example of FIG. 6A, the radial UI 600 is in a default or otherwise normal position. In particular, the normal position positions the zero (0) button located at 0 degrees on the circular shape 602, the one (1) button located at 36 degrees, the two (2) button located at 72 degrees, the three (3) button located at 108 degrees, the four (4) button located at 144 degrees, the five (5) button located at 180 degrees, the six (6) button located at 216 degrees, the seven (7) button located at 252 degrees, the eight (8) button located at 288 degrees, and the nine (9) button located at 324 degrees. Similar to aforementioned drum-based UIs, the example radial UI 600 accommodates spatial familiarity because the zero (0) button is followed by the one (1) button, which is followed by the two (2) button, and so on. For example, if a user sees the five (5) button, then that user will intuitively appreciate that the four (4) button and the six (6) button are each adjacent thereto.

Figure 6B:
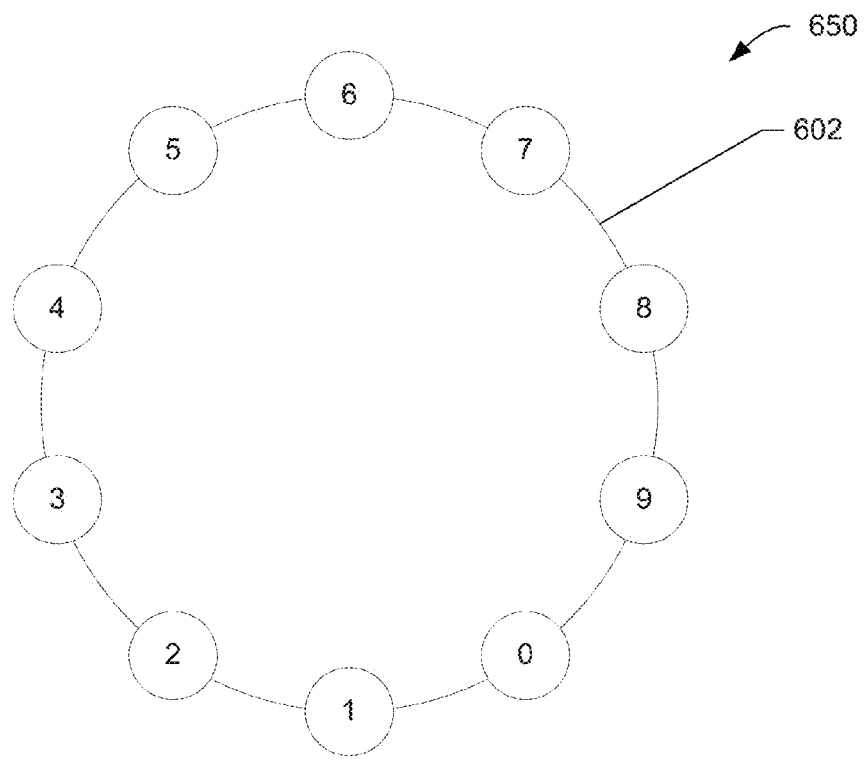

However, in the event malware operating on the example platform 400 had access to one or more input mechanisms (e.g., a touch screen overlay), then the spatial coordinates of each button press could be derived by the malware under the assumption that the rotational orientation of the radial UI 600 remained constant with the zero (0) button at 0 degrees. To introduce entropy associated with potential eavesdroppers and/or input monitoring, the example radial UI 600 may be rotated any number of degrees prior to display to the user of the example platform 400. FIG. 6B includes an example randomly rotated radial UI 650 have ten (10) radially and sequentially arranged buttons (zero through nine). However, unlike the illustrated example of FIG. 6A, in which the radial UI 600 has the zero (0) button located at 0 degrees of the circular shape 602, the example randomly rotated radial UI 650 has the zero (0) button located at 144 degrees. As such, while malware operating on the example platform 400 may still be able to identify coordinate values associated with one or more button presses by the user, the prior assumption that coordinates associated with the zero (0) button are located at the top of the circular shape 602 are no longer true. Such entropy introduced by rotating the spatial orientation of the buttons around the circular shape 602 result in meaningless and/or otherwise incorrect value derivation by the malware that is unaware of the rotational offset.

Figure 6C:
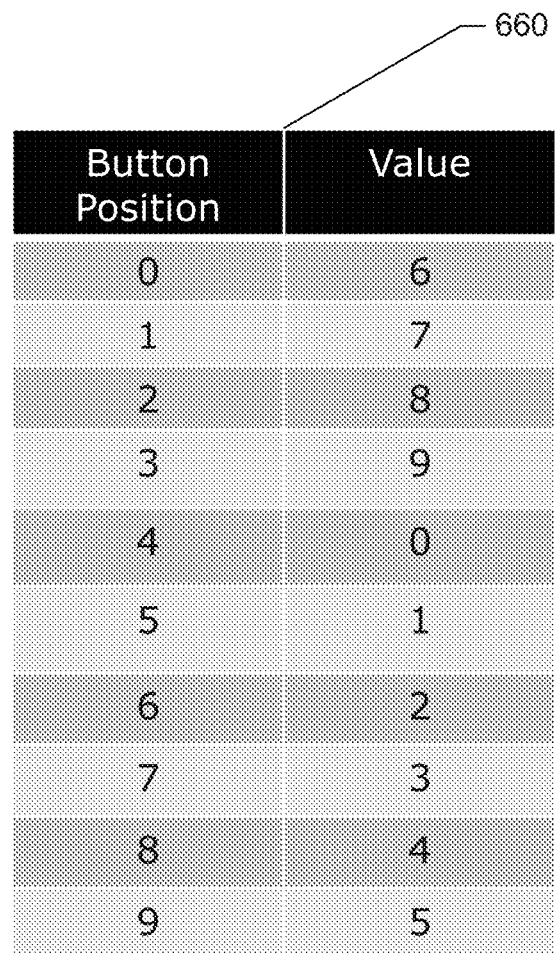

After the rotational orientation of a radial UI is selected (e.g., via a random number generator, user selection, etc.), an index of each button position and/for a rotational offset value from normal is stored in a translation map of the trusted environment. FIG. 6C illustrates an example translation map 660 including a button position column 662 and a value column 664. In the illustrated example of FIG. 6C, in the event a user of the platform 400 depresses the button that corresponds to zero in a normal position, the mapping table 660 decodes that button press to represent the value six (6).

While the example randomly rotated radial UI 650 includes ten separate buttons and corresponding numeric values, example methods, apparatus, systems and/or articles of manufacture are not limited thereto. Additionally, examples disclosed herein are not limited to a circular shape. For example, any closed-loop shape (e.g., square, rectangle, triangle, oval, symmetric, asymmetric, etc.) may be generated by the example user interface manager 420 having any number of selectable buttons arranged.

Figures 7A, 7B:
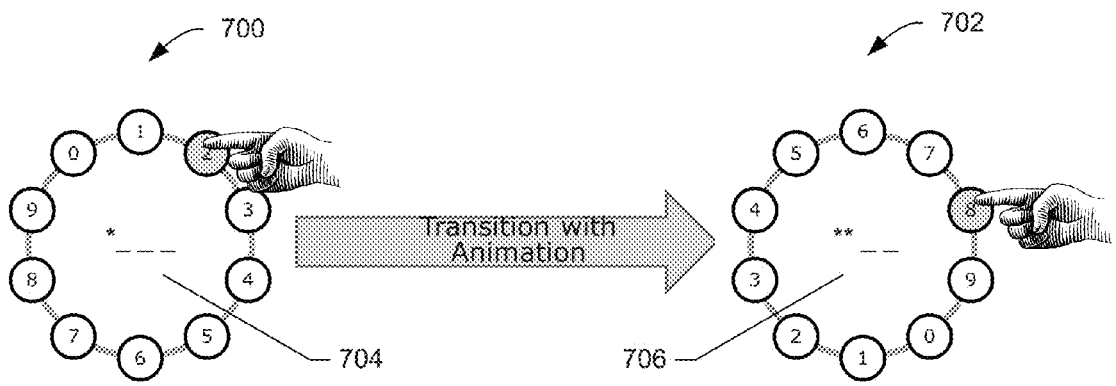
FIG. 7A is an example rotated radial user interface generated by the example trusted execution environment of FIG. 4 to facilitate secure screen input.

In some examples, the closed-loop shape may be re-randomized to a new rotational orientation in response to each user selection. FIG. 7A includes a first rotated radial UI 700 at a first time, and a second rotated radial UI 702 at a second time. The example first rotated radial UI 700 and the example second rotated radial UI 702 are, for all practical purposes, the same UI presented to the user, but with differing rotational starting points for corresponding selectable buttons (e.g., buttons 0 through 9). The example first rotated radial UI 700 has a starting position offset −36 degrees from normal (or +324 degrees from normal), in which the zero (0) button is located 36 degrees counter-clockwise from the top (zero (0) degree position) of the first rotated radial UI 700. After the user of the example platform 400 selects the value "2" from the first rotated radial UI 700, the example user interface manager 420 re-randomizes the rotational orientation, as shown by the second rotated radial UI 702. Additionally, the example user interface manager 420 places an asterisk 704 in the center of the UI to illustrate how many digits of a password have been selected. In the illustrated example of FIG. 7A, the second rotated radial UI 702 has a starting position offset 144 degrees from normal. In response to the user selecting the value "8," which normally corresponds to the value "2," the example user interface manager 420 places another asterisk 706 in the center of the UI to illustrate that a second digit of the password has been selected.

FIG. 7B illustrates an example translation map 750 generated by the example translation map manager 424 that corresponds with the example rotated radial UN (e.g., the first rotated radial UI 700 and the second rotated radial UI 702 of FIG. 7A). In the illustrated example of FIG. 7B, the translation map 750 includes a normal button position column 752, a first value column 754, a second value column 756, and any number of additional value columns added by the example translation map manager 424 based on the number of digits for a particular password. The example normal button position column 752 reflects a rotated radial UI that does not have any randomized rotational positioning (e.g., the zero (0) button is at the top). Prior to entry of a password, the example ordinal sequence generator 422 generates a random rotational position to be displayed on the radial UI 700, which is shown 36 degrees counter-clockwise from normal. Additionally, the example translation map manager 424 updates the first value column 754 to reflect the randomized lookup values. As a result, button value "1" appears where the button value "0" used to be located in the normal position. Assuming that the user desires to enter the value "2," then any coordinates collected by malware will identify that value "1" was selected. In other words, the malware will report the incorrect password entry. The selected value is shown in the illustrated example of FIG. 7B as "2" with a circle around it.

After the user makes a selection for a first value associated with the password, the example ordinal sequence generator 422 applies another randomization to reveal a new rotational position for the values of the second rotated radial UI 702. Additionally, the example translation map manager 424 updates a next available value column to reflect the new button positions. In the illustrated example of FIG. 7B, the second value column reflects that the button rotational orientation is 144 degrees clockwise from normal. As a result, button value "1" appears where the button value "5" used to be located in the normal position. Assuming that the user desires to enter the value "8," then any coordinates collected by malware will identify that value "2" was selected. In other words, the malware will report the incorrect password entry. The selected value is shown in the illustrated example of FIG. 7B as "8" with a circle around it.

While the illustrated example of FIG. 7A presents a single radial UI to the user at one time, example methods, apparatus, systems turn/or articles of manufacture disclosed herein are not limited thereto. For example, multiple radial ills may be presented on the example UI 402 simultaneously, in which each radial UI may correspond to each one of any number of digits associated with a password to be entered.

While an example manner of implementing the TEE 406 of FIG. 4 is illustrated in FIGS. 3A, 3B, 4, 5, 6A, 6B, 6C, 7A and 7B, one or more of the elements, processes and/or devices illustrated in FIGS. 3A, 3B, 4, 5, 6A, 6B, 6C, 7A and 79 may be combined, divided, re-arranged, omitted, eliminated and/or implemented in any other way. Further, the example rotating drum display 300, the example translation map 350, the example user interface 402, the example TEE 406, the example user interface manager 420, the example ordinal sequence generator 422, the example translation map manager 424, the example offset calculator 428, the example translation map storage 426, the example randomly rotated radial UI 650, the example mapping table 660, the example first rotated radial UI 700, the example second rotated radial UI 702, the example translation map 750 and/or, more generally, the example platform 400 of FIG. 4 may be implemented by hardware, software, firmware and/or any combination of hardware, software and/or firmware. Thus, for example, any of the example rotating drum display 300, the example translation map 350, the example user interface 402, the example TEE 406. The example user interface manager 420, the example ordinal sequence generator 422, the example translation map manager 424, the example offset calculator 428, the example translation map storage 426, the example randomly rotated radial UI 650, the example mapping table 660, the example first rotated radial UI 700, the example second rotated radial UI 702, the example translation map 750 and/or, more generally, the example platform 400 of FIG. 4 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example rotating drum display 300, the example translation map 350, the example user interface 402, the example TEE 406, the example user interface manager 420, the example ordinal sequence generator 422, the example translation map manager 424, the example offset calculator 428, the example translation map storage 426, the example randomly rotated radial UI 650, the example mapping table 660, the example first rotated radial UI 700, the example second rotated radial UI 702, the example translation map 750 and/or the example platform 400 of FIG. 4 is/are hereby expressly defined to include a tangible computer readable storage device or storage disk such as a memory, a digital versatile disk (DVD), a compact disk (CD), a Blu-ray disk, etc. storing the software and/or firmware. Further still, the example TEE 406 of FIG. 4 may include one or more elements, processes and/or devices in addition to, or instead of, those illustrated in FIG. 4, and/or may include more than one of any or all of the illustrated elements, processes and devices.

Figure 8:
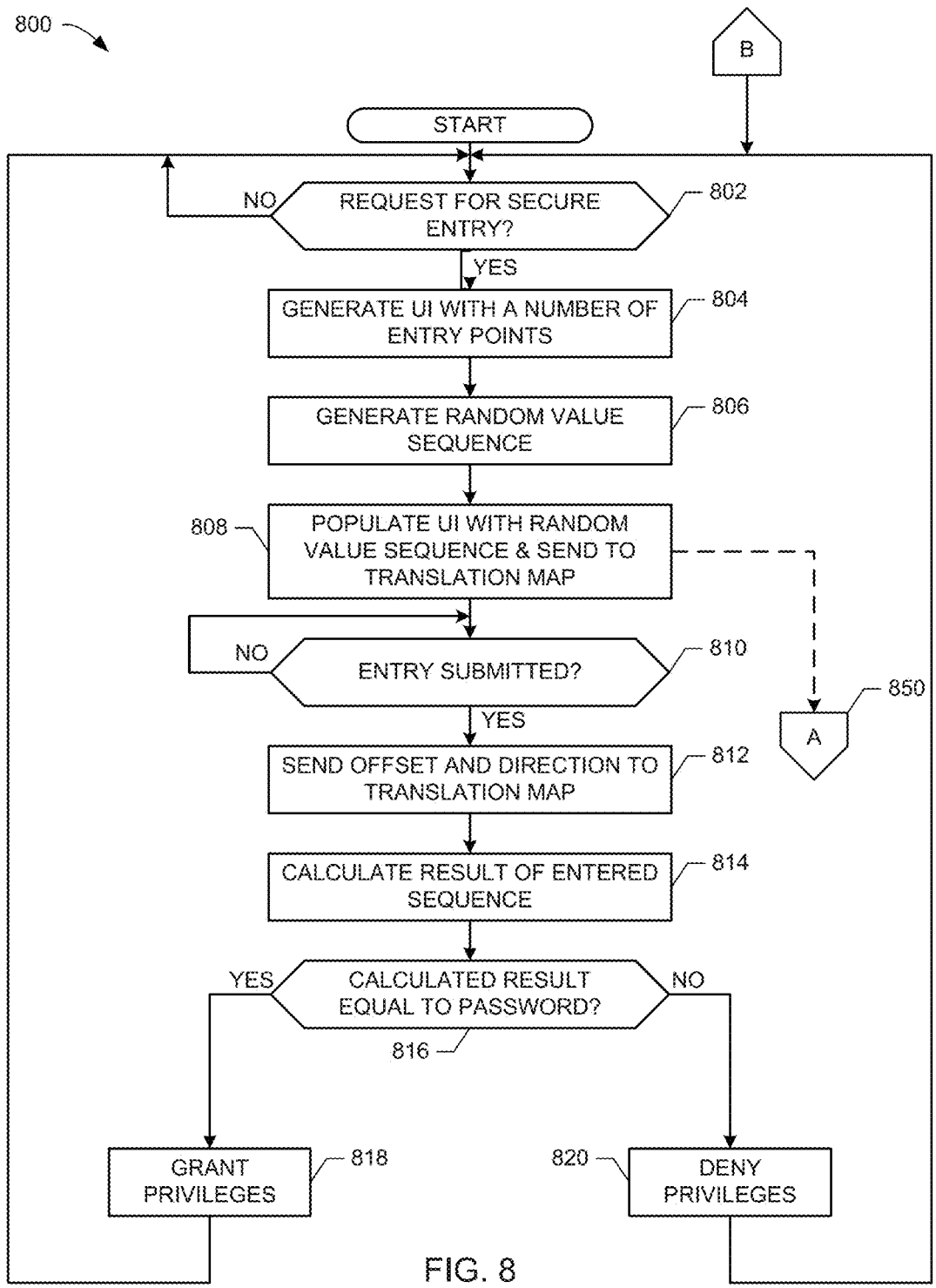
FIGS. 8 and 9 are flowcharts representative of example machine readable instructions that may be executed to facilitate secure screen input.
Figure 9:
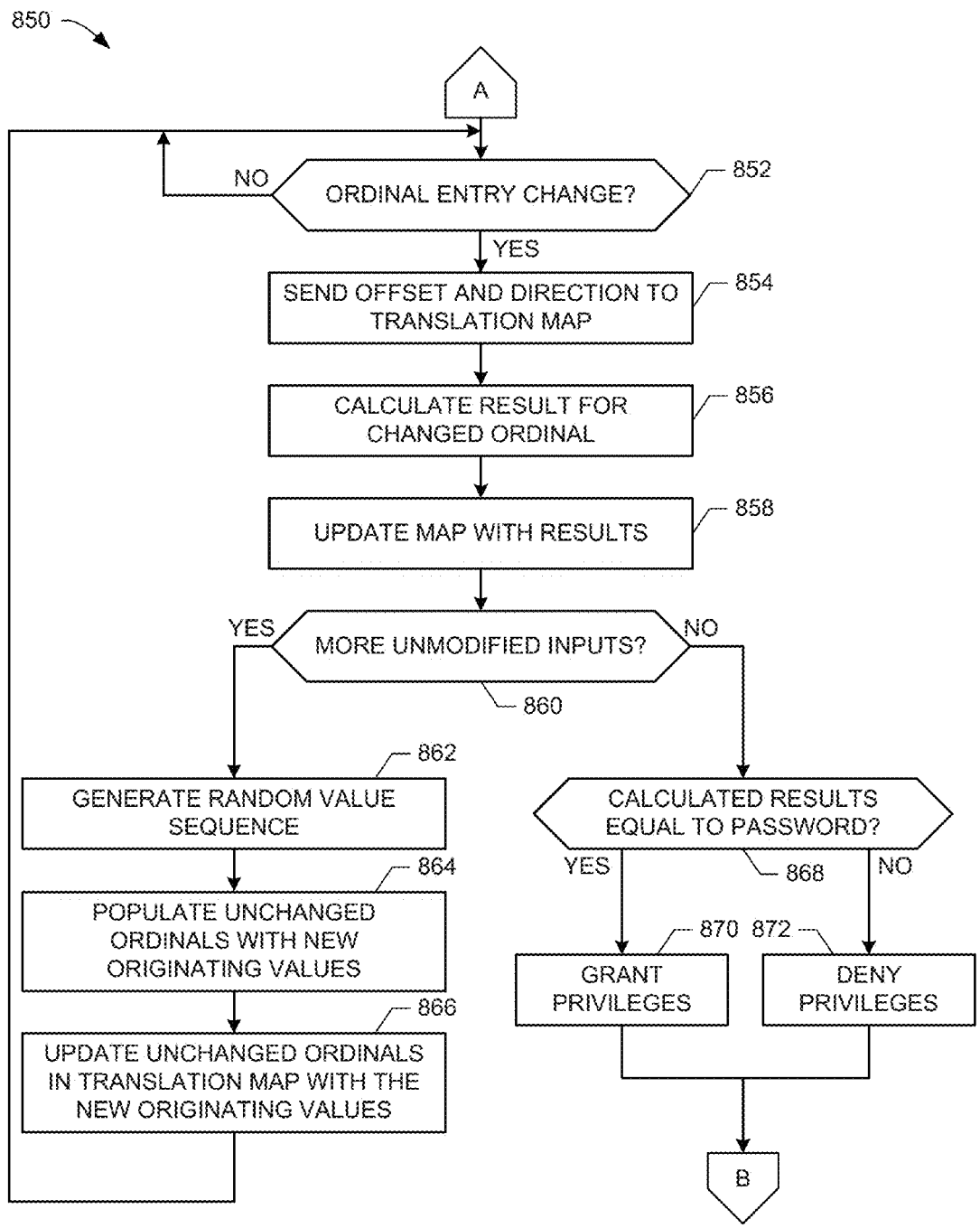

A flowchart representative of example machine readable instructions for implementing the TEE 406 of FIG. 4 is shown in FIGS. 8 and 9. In these examples, the machine readable instructions comprise programs for execution by a processor such as the processor 1012 shown in the example processor platform 1000 discussed below in connection with FIG. 10. The program(s) may be embodied in software stored on a tangible computer readable storage medium such as a CD-ROM, a floppy disk, a hard drive, a digital versatile disk (DVD), a Blu-ray disk, or a memory associated with the processor 1012, but the entire program(s) and/or parts thereof could alternatively be executed by a device other than the processor 1012 and/or embodied in firmware or dedicated hardware. Further, although the example programs are described with reference to the flowcharts illustrated in FIGS. 8 and 9, many other methods of implementing the example TEE 406 may alternatively be used. For example, the order of execution of the blocks may be changed, and/or some of the blocks described may be changed, eliminated, or combined.

As mentioned above, the example processes of FIGS. 8 and 9 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 8 and 9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The program 800 of FIG. 8 begins at block 802 where the example user interface manager 420 determines whether a request for entry of a password has occurred. If not, the example program 800 of FIG. 8 continues to wait for an instance of password entry, such as user interaction occurring on the example UI 402. In response to detecting an instance of a request to enter password information (block 802), the example user interface manager 420 generates a UI with a number of entry points that correspond to the number of characters of the password (block 804). For example, the TEE 406 may operate as a secure repository for passwords associated with the platform 400 and, once password entry information is retrieved and/or otherwise received by the example TEE 406, a comparison is made to determine whether access and/or privileges should be granted. The example UI generated by the example user interface manager 420 may include, but is not limited to a rotating drum display the rotating drum display 300 of FIG. 3A), or a rotating closed-loop UI (e.g., the example first rotated radial UI 700, the example second rotated radial UI 702, a polygon shape UI, etc.).

In some examples, the example user interface manager 420 monitors the operating system 404 and/or the UI 402 for a default UI generated by the example platform 400 and, if detected, the example user interface manager 420 overrides the default UI for a rotating drum display or rotating closed loop UI. The example ordinal sequence generator 422 generates a random value sequence or a rotational offset (block 806), and the example user interface manager 420 populates the example UI 402 with the random starting UI display (block 808). Additionally, the example translation map manager 424 generates and/or otherwise updates a translation map to allow entry input data received from the UI 402 to be decoded into accurate password entry values (block 808).

If the example user interface manager 420 detects user input from the UI 402 in the form of an offset value and direction (block 810), then the translation map is updated with the user input information (block 812). As described above, received and/or otherwise retrieved user input information from touch screens, keyboards, mice and/or other input devices are at risk of being monitored by malware. Although the user input coordinates via a touch screen or mouse click may be intercepted, because the user interface display values are randomized, the retrieved offset and direction data or rotated radial data cannot be used to derive the proper value selected by the user. The example offset calculator 428 calculates the true password value entered by the user based on a comparison between the previously established random character sequence and the offset/direction information (block 814). If the example user interface manager 420 identifies a match between the correct password information and the password information entered by the user (block 816), then privileges are granted (block 818). However, incorrect entries result in a denial of privileges (block 820), such as a signal sent by the example user interface manager 420 to the operating system 404 that access (e.g., hardware access) should be denied.

In some examples, randomization of the UI (e.g., rotated radial UI, rotating drum UI, etc.) occurs after each entry attempt by a user. Returning to block 808 of FIG. 8, after an initial random arrangement established, control advances to block 850 in which the example user interface manager 420 monitors for an entry change (block 852). An entry change may include an upward or downward rotation of a rotating dial, or may include a selection of a button on a rotated dial UI. In response to detecting an entry change on the UI (block 852), the example user interface manager 420 sends retrieved and/or otherwise received offset/direction information to the translation map (block 854), and the example offset calculator 428 calculates the true result of the changed ordinal (block 856). The example translation map manager 424 updates the translation map (block 858) (e.g., the example translation map 350 of FIG. 3B, the example translation map 750 of FIG. 7B, etc.). In the event the user has not made an entry or selection for all characters of the password, as determined by the example ordinal sequence generator 422 (block 860), then the ordinal sequence generator 422 generates a new random value sequence (or generates a new rotational position if a rotated radial-type UI is used) (block 862).

The example user interface manager 420 populates any previously unaltered ordinals in the UI 402 with the new randomized values (block 864) and updates the example translation map with the new randomized originating values (block 866). Control returns to block 852, where the example user interface manager 420 continues to monitor for an instance of user input. On the other hand, if all characters for the password have been entered (block 860), then the example user interface manager 420 determines whether the password information is correct by comparing the password stored in the TEE 406 with the translated password (block 868). If the example user interface manager 420 identifies a match between the correct password information and the password information entered by the user (block 868), then privileges are granted (block 870). However, incorrect entries result in a denial of privileges (block 872), such as a signal sent by the example user interface manager 420 to the operating system 404 that access (e.g., hardware access) should be denied.

Figure 10:
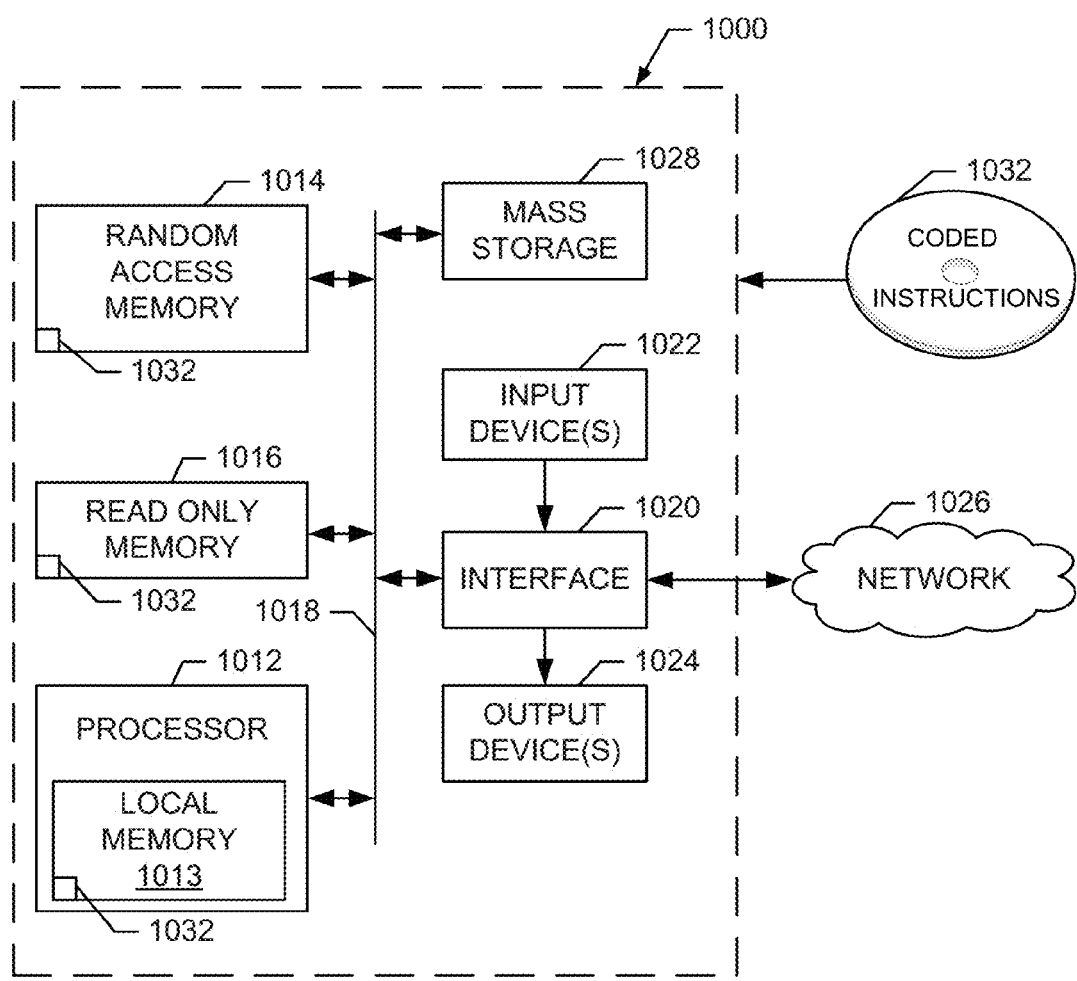
FIG. 10 is a schematic illustration of an example processor platform that may execute the instructions of FIGS. 8 and 9 to implement the example trusted execution environment of FIG. 4.

FIG. 10 is a block diagram of an example processor platform 1000 capable of executing the instructions of FIGS. 8 and 9 to implement the TEE 406 of FIG. 4. The processor platform 1000 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, and/or a trackball.

One or more output devices 1024 are also connected to the interface circuit 1020 of the illustrated example. The output devices 1024 can be implemented, for example, by display devices (e.g., a light emitting diode (LED), an organic light emitting diode ((SLED), a liquid crystal display, a cathode ray tube display (CRT), a touchscreen, a tactile output device, a light emitting diode (LED), a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives.

The coded instructions 1032 of FIGS. 8 and 9 may be stored in the mass storage device 1028, in the volatile memory 1014, in the non-volatile memory 1016, and/or on a removable tangible computer readable storage medium such as a CD or DVD.

From the foregoing, it will be appreciated that the above disclosed methods, apparatus and articles of manufacture allows for user password entry on a platform that has been infected by a virus and/or malware capable of capturing coordinate location information associated with touchscreen inputs and/or mouse click inputs. Additionally, examples disclosed herein maintain alternate user interface configurations that obfuscate a true meaning of one or more user inputs because the initial user interface entry points are populated with randomized values stored in a trusted execution environment. Proper passwords are calculated within the trusted execution environment in a manner outside the reach of Malware observation. Further, examples disclosed herein maintain benefits associated with user muscle memory and/or layout familiarity by generating user interfaces that have intuitive and/or otherwise expected adjacent positions to allow a user to quickly navigate to one or more values for each entry point.

The following examples pertain to further examples. An example apparatus to verify password entry includes a user interface (UI) manager to generate a UI comprising a quantity of ordinal entry points, each one of the quantity of ordinal entry points comprising a repeating selectable pattern an ordinal sequence generator to generate an initial randomized combination of the quantity of ordinal entry points, the randomized combination stored in a trusted execution environment, and an offset calculator to calculate a password entry value by comparing an offset value and direction value retrieved from the UI with the initial randomized combination of the quantity of ordinal entry points. Other disclosed example apparatus include the UI manager to generate the repeating selectable pattern as a numerically consecutive series, and the UI manager to generate the repeating selectable pattern as a series of symbols. Further disclosed examples include the UI manager to generate the UI as a rotating drum display, in which the UI manager is to generate the quantity of ordinal entry points as a series of adjacent rotating drums. Some disclosed examples include the ordinal sequence generator to re-randomize unmodified ones of the quantity of ordinal entry points in response to modification of a first one of the quantity of ordinal entry points, in which the UI manager is to populate the UI with the re-randomized unmodified ones of the quantity of ordinal entry points. Still other disclosed example apparatus include the UI manager to detect at least one of an upward direction value or a downward direction value, and to detect a number of rotational positions moved in a direction associated with the direction value. Still further examples disclosed above include the UI manager to generate the UI as at least one of a rotating drum display or a sequence of radially spaced buttons.

An additional apparatus to conceal password entry of a malware infected platform, malware infected device, and/or hardware or software of any origin that is attempting to observe entry of secret and/or sensitive information includes a user interface (UI) manager to generate a UI comprising a quantity of radially spaced buttons arranged in a repeating selectable order, a sequence generator to generate an initial randomized rotational orientation of the radially spaced buttons, the initial randomized rotational orientation having a rotational offset from a normal position, and an offset calculator to calculate a password entry value by calculating a rotational difference between a selected one of the quantity of radially spaced buttons in the initial randomized rotational orientation and the normal position.

An example method to verify password entry includes generating a user interface (UI) comprising a quantity of ordinal entry points, each one of the quantity of ordinal entry points comprising a repeating selectable pattern, generating an initial randomized combination of the quantity of ordinal entry points, the randomized combination stored in a trusted execution environment, and calculating a password entry value by comparing an offset value and direction value retrieved from the UI with the initial randomized combination of the quantity of ordinal entry points. Example methods disclosed herein further include generating the repeating selectable pattern as a numerically consecutive series, and generating the repeating selectable pattern as a series of symbols. Additional example methods include generating the UI as a rotating drum display, and generating the quantity of ordinal entry points as a series of adjacent rotating drums. Some example methods disclosed herein include re-randomizing unmodified ones of the quantity of ordinal entry points in response to modification of a first one of the quantity of ordinal entry points, and populating the UI with the re-randomized unmodified ones of the quantity of ordinal entry points. Other examples disclosed herein include detecting at least one of an upward direction value or a downward direction value, and still other examples disclosed herein include detecting a number of rotational positions moved in a direction associated with the direction value. Example methods disclosed above may further include generating the UI as at least one of a rotating drum display or a sequence of radially spaced buttons.

An example disclosed computer readable storage medium includes generating a user interface (UI) comprising a quantity of ordinal entry points, each one of the quantity of ordinal entry points comprising a repeating selectable pattern, generating an initial randomized combination of the quantity of ordinal entry points, the randomized combination stored in a trusted execution environment, and calculating a password entry value by comparing an offset value and direction value retrieved from the UI with the initial randomized combination of the quantity of ordinal entry points. Some example disclosed instructions include generating the repeating selectable pattern as a numerically consecutive series, and generating the repeating selectable pattern as a series of symbols. Other example disclosed instructions include generating the UI as a rotating drum display, in which the quantity of ordinal entry points are generated as a series of adjacent rotating drums. Some examples disclosed herein include re-randomizing unmodified ones of the quantity of ordinal entry points in response to modification of a first one of the quantity of ordinal entry points, and populating the UI with the re-randomized unmodified ones of the quantity of ordinal entry points. Other example disclosed instructions include detecting at least one of an upward direction value or a downward direction value, and detecting a number of rotational positions moved in a direction associated with the direction value. Still other disclosed instructions include generating the UI as at least one of a rotating drum display or a sequence of radially spaced buttons.

An example disclosed system to verify password entry include means for generating a user interface (UI) comprising a quantity of ordinal entry points, each one of the quantity of ordinal entry points comprising a repeating selectable pattern, means for generating an initial randomized combination of the quantity of ordinal entry points, the randomized combination stored in a trusted execution environment, and means for calculating a password entry value by comparing an offset value and direction value retrieved from the UI with the initial randomized combination of the quantity of ordinal entry points. Still other disclosed systems include means for generating the repeating selectable pattern as a numerically consecutive series, while other disclosed systems include means for generating the repeating selectable pattern as a series of symbols. Some disclosed systems include means for generating the UI as a rotating drum display, and other disclosed systems include means for generating the quantity of ordinal entry points as a series of adjacent rotating drums. Additional systems disclosed herein include means for re-randomizing unmodified ones of the quantity of ordinal entry points in response to modification of a first one of the quantity of ordinal entry points, and means for populating the UI with the re-randomized unmodified ones of the quantity of ordinal entry points. Still other disclosed systems include means for detecting at least one of an upward direction value or a downward direction value. Some disclosed systems include means for detecting a number of rotational positions moved in a direction associated with the direction value.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to accept entry of a password, the apparatus comprising:
 a user interface (UI) manager to generate a radial UI including a plurality of user selectable symbols sequentially arranged around the radial UI, the radial UI having a first rotational position including first radial positions and corresponding first values for respective ones of the sequentially-arranged user selectable symbols;
 an ordinal sequence generator to generate a second rotational position of the radial UI different from the first rotational position, the second rotational position including second radial positions and corresponding second values for respective ones of the sequentially-arranged user selectable symbols, the second values different from the first values, the second rotational position stored in a trusted execution environment; and
 a translation map manager to determine, by correlating the second rotational position to the first rotational position, a password entry value corresponding to user selection of a first one of the sequentially-arranged user selectable symbols of the radial UI displayed in the second rotational position, the user selection indicating a corresponding one of the first values corresponding to a one of the first radial positions of a corresponding one of the sequentially-arranged user selectable symbols of the radial UI associated with the first rotational position, at least one of the UI manager, the ordinal sequence generator, and the translation map manager being implemented using a logic circuit.

2. An apparatus as defined in claim 1, wherein the second rotational position is stored in a translation map of the trusted execution environment.

3. An apparatus as defined in claim 2, wherein the first rotational position is stored in the translation map.

4. An apparatus as defined in claim 3, wherein the translation map manager is to correlate the second rotational position to the first rotational position based on the translation map.

5. An apparatus as defined in claim 1, wherein the UI manager is to generate a number of instances of the radial UI, respective ones of the number of instances of the radial UI being associated with a corresponding character of the password, the number of instances of the radial UI being equal to a number of characters of the password.

6. An apparatus as defined in claim 5, wherein a second one of the instances of the radial UI is to be presented in response to the user selection, the user selection being associated with a first one of the instances of the radial UI.

7. An apparatus as defined in claim 5, wherein a second one of the instances of the radial UI is to be presented simultaneously with a first one of the instances of the radial UI.

8. An apparatus as defined in claim 5, wherein the ordinal sequence generator is to generate first random rotational positions for the instances of the radial UI, respective ones of the first random rotational positions being associated with a corresponding instance of the radial UI, respective ones of the first random rotational positions being different from the first rotational position.

9. An apparatus as defined in claim 8, wherein a one of the first random rotational positions is different from another one of the first random rotational positions.

10. A machine accessible storage device or storage disk comprising instructions that, when executed, cause at least one machine to at least:
 generate a radial UI including a plurality of user selectable symbols sequentially arranged around the radial UI, the radial UI having a first rotational position including first radial positions and corresponding first values for respective ones of the sequentially-arranged user selectable symbols;
 generate a second rotational position of the radial UI different from the first rotational position, the second random rotational position including second radial positions and corresponding second values for respective ones of the sequentially-arranged user selectable symbols, the second values different from the first values, the second rotational position stored in a trusted execution environment; and
 determine, by correlating the second rotational position to the first rotational position, a password entry value corresponding to user selection of a first one of the sequentially-arranged user selectable symbols of the radial UI displayed in the second rotational position, the user selection indicating a corresponding one of the first values corresponding to a one of the first radial positions of a corresponding one of the sequentially-arranged user selectable symbols of the radial UI associated with the first rotational position.

11. A machine accessible storage device or storage disk as defined in claim 10, wherein the instructions, when executed, further cause the at least one machine to generate a number of instances of the radial UI, respective ones of the number of instances of the radial UI being associated with a corresponding character of a password, the number of instances of the radial UI being equal to a number of characters of the password.

12. A machine accessible storage device or storage disk as defined in claim 11, wherein a second one of the instances of the radial UI is to be presented in response to the user selection, the user selection being associated with a first one of the instances of the radial UI.

13. A machine accessible storage device or storage disk as defined in claim 11, wherein a second one of the instances of the radial UI is to be presented simultaneously with a first one of the instances of the radial UI.

14. A machine accessible storage device or storage disk as defined in claim 11, wherein the instructions, when executed, further cause the at least one machine to generate first random rotational positions for the instances of the radial UI, respective ones of the first random rotational positions being associated with a corresponding instance of the radial UI, respective ones of the first random rotational positions being different from the first rotational position.

15. A machine accessible storage device or storage disk as defined in claim 14, wherein a one of the first random rotational positions is different from another one of the first random rotational positions.

16. A method for receiving a password, the method comprising:
    generating, by executing at least one computer readable instruction with at least one hardware processor, a radial UI including a plurality of user selectable symbols sequentially arranged around the radial UI, the radial UI having an associated normal rotational position including normal radial positions and corresponding normal values for respective ones of the sequentially-arranged user selectable symbols;
    generating, by executing at least one computer readable instruction with the at least one hardware processor, an initial random rotational position of the radial UI different from the normal rotational position, the initial random rotational position including modified radial positions and corresponding modified values for respective ones of the sequentially-arranged user selectable symbols, the modified values different from the normal values, the initial random rotational position stored in a trusted execution environment; and
    determining, by executing at least one computer readable instruction with the at least one hardware processor to correlate the initial random rotational position to the normal rotational position, a password entry value corresponding to user selection of a first one of the sequentially-arranged user selectable symbols of the radial UI displayed in the initial random rotational position, the user selection indicating a corresponding one of the normal values corresponding to a one of the normal radial positions of a corresponding one of the sequentially-arranged user selectable symbols of the radial UI associated with the normal rotational position.

17. A method as defined in claim 16, further including generating a number of instances of the radial UI, respective ones of the number of instances of the radial UI being associated with a corresponding character of the password, the number of instances of the radial UI being equal to a number of characters of the password.

18. A method as defined in claim 17, wherein a second one of the instances of the radial UI is to be presented in response to the user selection, the user selection being associated with a first one of the instances of the radial UI.

19. A method as defined in claim 17, further including generating initial random rotational positions for the instances of the radial UI, respective ones of the initial random rotational positions being associated with a corresponding instance of the radial UI, respective ones of the initial random rotational positions being different from the normal rotational position.

20. A method as defined in claim 19, wherein a one of the initial random rotational positions is different from another one of the initial random rotational positions.

* * * * *